(12) United States Patent
Eland et al.

(10) Patent No.: US 6,188,537 B1
(45) Date of Patent: Feb. 13, 2001

(54) POSITIONING USING A POSITION SENSOR AND A CALIBRATED OFFSET BETWEEN THE POSITION SENSOR AND A REFERENCE POSITION

(75) Inventors: Michael P. Eland; Kevin L. Miller, both of Loveland, CO (US)

(73) Assignee: Hewlett-Packard Company, Palo Alto, CA (US)

(*) Notice: Under 35 U.S.C. 154(b), the term of this patent shall be extended for 1107 days.

(21) Appl. No.: 08/603,696

(22) Filed: Feb. 20, 1996

Related U.S. Application Data

(63) Continuation of application No. 08/165,231, filed on Dec. 10, 1993, now abandoned.

(51) Int. Cl.[7] .................................................. G11B 21/02
(52) U.S. Cl. ........................................ 360/75; 360/78.02
(58) Field of Search ................................. 360/75, 77.02, 360/77.01, 78.01, 78.02, 78.13

(56) References Cited

U.S. PATENT DOCUMENTS

| | | | |
|---|---|---|---|
| 4,462,159 | 7/1984 | Nelle | 33/125 |
| 4,479,716 | 10/1984 | Nelle | 356/374 |
| 4,622,603 * | 11/1986 | Mizunuma et al. | 360/78.13 |
| 4,866,548 | 9/1989 | Rudi | 360/77.02 |
| 5,491,595 * | 2/1996 | Alsborg et al. | 360/75 |
| 5,552,945 * | 9/1996 | Miura et al. | 360/75 X |

FOREIGN PATENT DOCUMENTS

| | | | |
|---|---|---|---|
| 0604722A2 | 7/1994 | (EP) | 5/34 |
| 2065872 | 7/1981 | (GB) | 11/2 |
| 2265719 | 10/1993 | (GB) | 5/245 |

OTHER PUBLICATIONS

Eisaku Shimizu, Patent Abstracts of Japan, "Magnetic Disk," vol. 11 No. 87, Mar. 17, 1987.*

* cited by examiner

Primary Examiner—Hoa T. Nguyen
Assistant Examiner—K. Wong
(74) Attorney, Agent, or Firm—Augustus W. Winfield

(57) ABSTRACT

A transducer position sensing system, in a electromechanical drive, for determining transducer position. A sensor is mounted with a non-adjustable position and without absolute position accuracy, thereby lowering manufacturing costs. The position of the transducer at which the sensor switches states is accurately determined in a manufacturing test fixture and recorded in a permanent memory used by a drive controller. The drive controller can then accurately determine transducer position during subsequent initialization procedures.

12 Claims, 3 Drawing Sheets

POSITIONING USING A POSITION SENSOR AND A CALIBRATED OFFSET BETWEEN THE POSITION SENSOR AND A REFERENCE POSITION

This is a continuation of application Ser. No. 08/165,231 filed on Dec. 10, 1993, now abandoned.

FIELD OF INVENTION

This invention relates generally to electromechanical devices such as disk drives and tape drives and more specifically to position sensors for transducers such as magnetic heads and optical data sensors.

BACKGROUND OF THE INVENTION

Electromechanical devices such as disk drives and tape drives often have a moveable transducer for data recording or reading. The transducer may be a magnetic recording head, a magnetic reading head, a combined magnetic recording and reading head, or in the case of optical disks, an optical sensor. Typically, at power on, absolute transducer position is uncertain. Transducer position is typically determined by driving the transducer into a mechanical stop or driving the transducer into a switch (mechanical or optical). Driving the transducer into a mechanical stop often generates audible noise. In addition, a mechanical stop may cause jamming of the transducer position actuator mechanism or other mechanical stress related problems. If a switch is used, the switch trip position must be accurately known. Typically, either the switch trip position is mechanically adjustable to an accurate position or the switch is mounted in a fixed position with absolute accuracy. In general, for switches mounted directly on printed circuit boards, the trigger position of the switch varies substantially from drive to drive due to component tolerances and manufacturing assembly tolerances. A transducer position sensing system is needed that can provide accurate position despite component and manufacturing assembly tolerances.

SUMMARY OF THE INVENTION

The present invention provides a transducer position sensing system that provides accurate transducer position without requiring absolute position accuracy of a sensor switching point. In addition, the transducer can pass through or beyond the switch point without causing mechanical stress on the transducer actuator mechanism. The switching position is fixed (non-adjustable) and does not require absolute mounting position accuracy or tight manufacturing tolerances, thereby lowering manufacturing costs. The switching position is repeatable within a drive but may vary from drive to drive. The switching position is accurately determined once during the manufacturing of the mechanism. The switching position is recorded in a permanent memory readable by a drive controller. Then, the switching position is permanently known by the drive controller. Knowing the switching position enables the drive to calibrate transducer position during an initialization procedure.

DETAILED DESCRIPTION OF THE PREFERRED EMBODIMENT OF THE INVENTION

Figure 1:
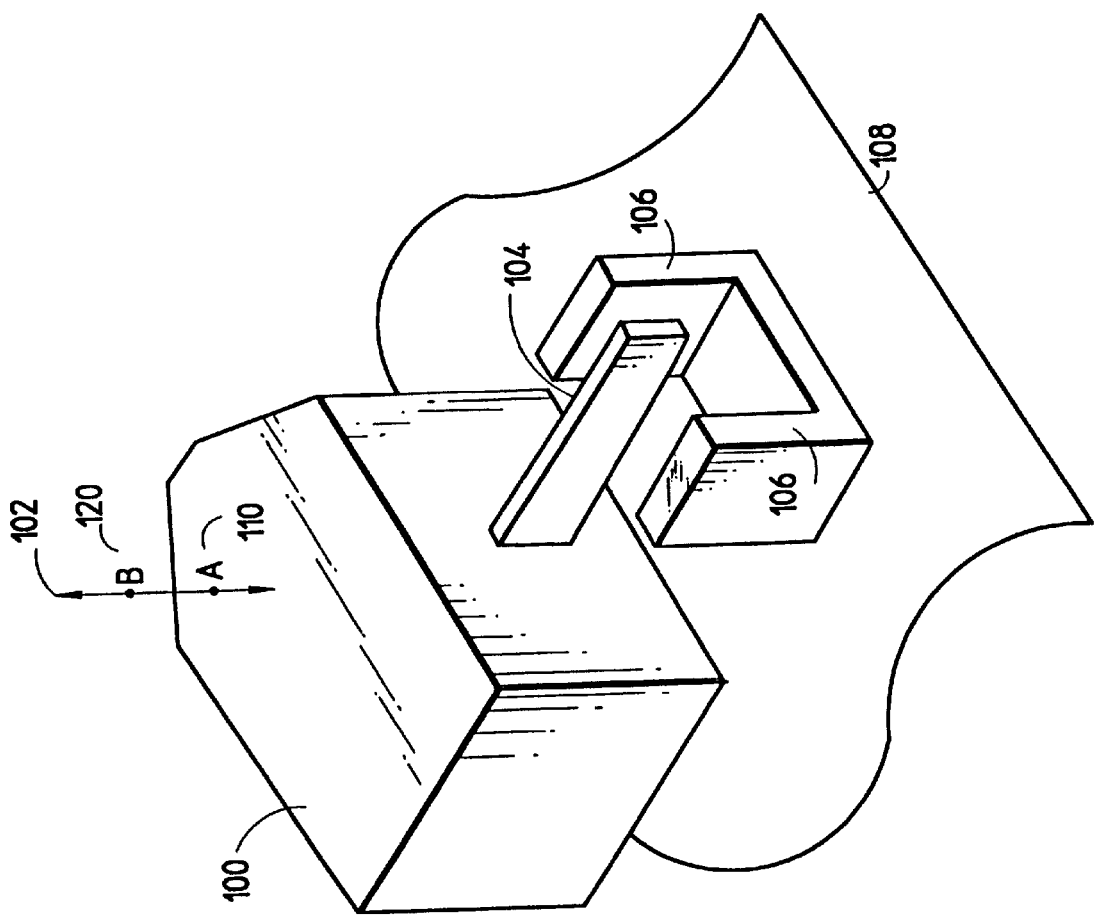
FIG. 1 is a mechanical perspective of a moveable magnetic head with a head position sensor.

FIG. 1 illustrates a magnetic head 100 with controlled movement along a directional axis 102. A relatively small mechanical projection 104 from the head 100 moves between a light source and a light receiver in an optical sensor 106. The optical sensor 106 is mounted on a printed circuit board that is part of a drive controller assembly 108. The drive controller assembly 108 includes other components such as a microprocessor (not illustrated). The drive controller assembly controls movement of the head 100. In general, for proper operation of any moveable head drive, the head 100 must be capable of being accurately positioned along direction 102 relative to a mechanical reference position A (110). For a tape drive, the mechanical reference position A (110) may correspond for example to a tape edge as determined by edge guides (not illustrated) or to a reference track recorded on a magnetic tape. For a disk drive, the mechanical reference position A (110) may define or align with the outer track or the inner track on a disk medium. In FIG. 1, when the mechanical projection 104 is at the switching point of the sensor 106 (that is, the sensor output changes from one sensor state to the opposite sensor state), the head 100 is positioned at point B (120). Point B (120) can be anywhere along the axis 102 as long the position of point B (120) is known relative to point A (110). It is not necessary for the drive controller assembly 108 to be accurately located relative to the mechanical reference point A (110) or for the optical sensor 106 to be accurately located relative to the drive controller assembly 108. The primary requirement is that the mechanical projection 104 must switch sensor 106 at some point along the allowable range of movement of head 100 along the axis 102. The mechanical projection 104 can pass through the switching point of the sensor 106.

Figure 2:
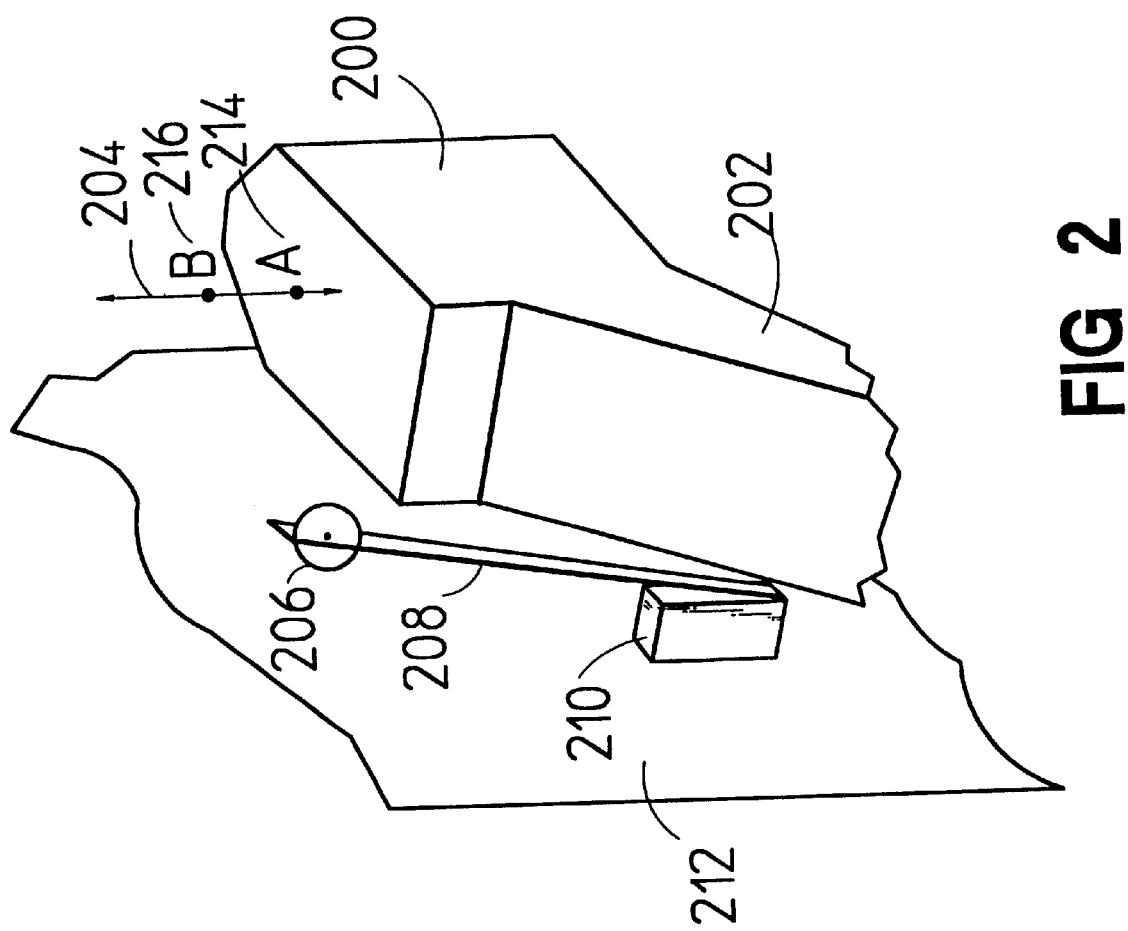
FIG. 2 is a mechanical perspective of an alternative embodiment of a moveable magnetic head with a position sensor.

FIG. 2 illustrates a magnetic head 200 mounted at the end of a relatively long lever arm 202 with controlled movement along directional axis 204. A roller 206 is mounted on a leaf spring connected to a mechanical switch 210. The mechanical switch 210 is mounted on a printed circuit board 212. The assembly can be designed so that either the head 204 deflects the roller 206 or the lever arm 202 deflects the roller 206. In either case, when the head 200 is at a point B (216) within the allowable range of movement of head 200 along axis 204, the switch 210 is tripped and the head or lever arm can pass through the trip point of the switch. For proper operation, the magnetic head 200 must be capable of being accurately positioned along direction 204 relative to a mechanical reference point A (214). It is not necessary for the printed circuit board 212 to be accurately located relative to the mechanical reference point A (214) or for the switch 210 to be accurately located relative to the printed circuit board 212.

Figure 3:
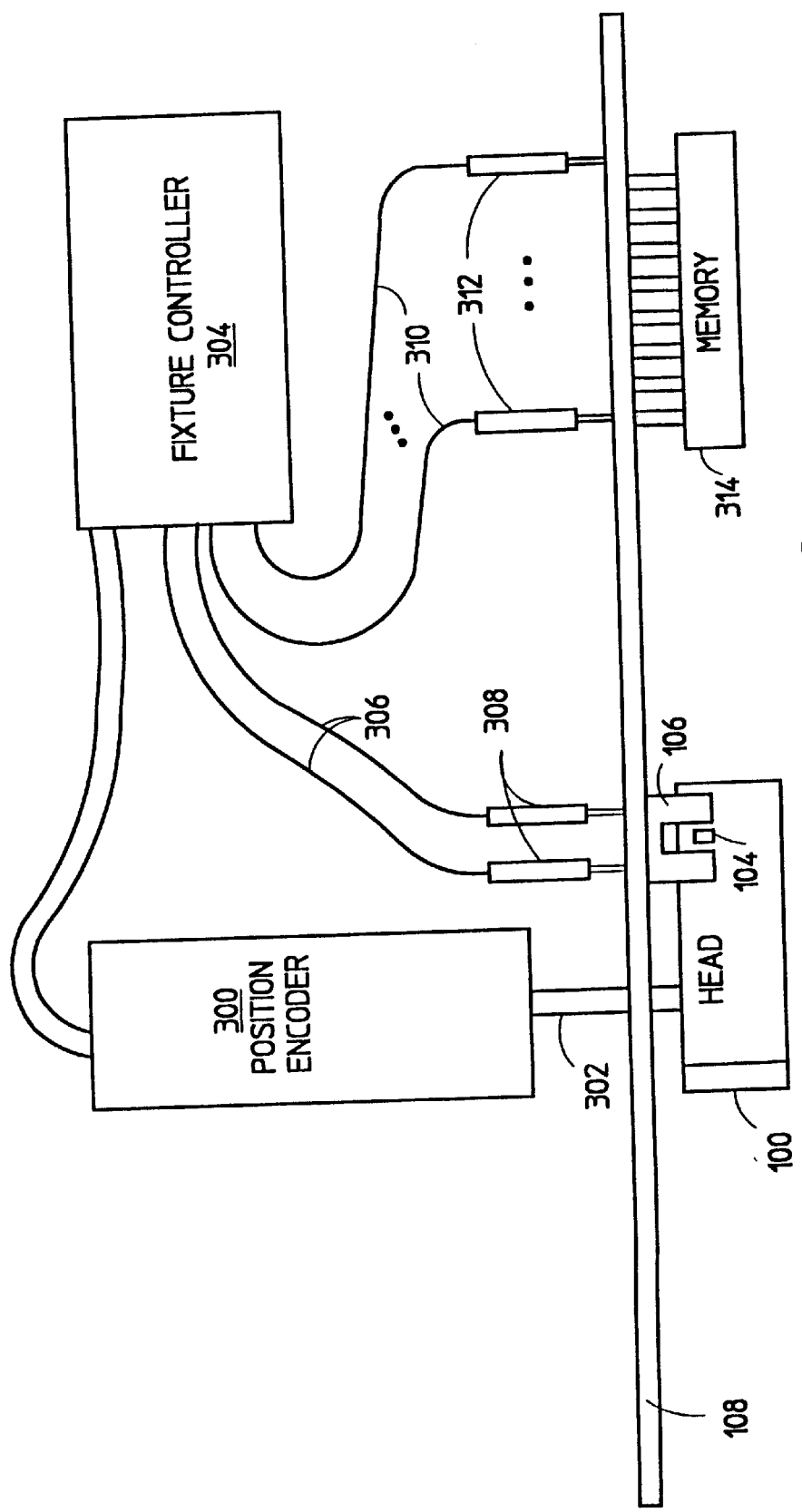
FIG. 3 is a mechanical block diagram of a calibration fixture for measuring head position and recording a switching position.

FIGS. 1 and 2 illustrate two example embodiments of moveable magnetic heads with position sensors with little or no mechanical stress on a head actuator mechanism. In addition, in the embodiments illustrated in FIGS. 1 and 2, the head can move through or beyond the point at which the sensor switches. However, there may be drive to drive variation in the position of the head at the switching point B relative to the mechanical reference position A. FIG. 3 illustrates a manufacturing test fixture that accurately measures the switching point B for each individual drive and permanently records that position in an electronic component of the drive controller. The specific embodiment illustrated in FIG. 3 is for a tape drive with a magnetic head. A similar fixture can be used for any moveable transducer requiring an initialization procedure to determine position.

In FIG. 3, the magnetic head 100, mechanical projection 104, optical sensor 106 and the drive controller assembly 108 are as depicted in FIG. 1. A linear position encoder 300 with a moveable probe 302 measures the position of the head 100 relative to the appropriate mechanical reference point A for the drive (not illustrated but discussed below). In the particular test fixture illustrated in FIG. 3, the moveable probe 302 passes through a hole in the drive controller assembly 108 and contacts the head 100 on the side closest to the printed circuit board as illustrated. A test fixture controller 304 reads the position of the head 100. In addition, the test fixture controller 304 senses the electrical state of the sensor 106 via a cable 306 and spring load probes 308 that contact pads on the printed circuit board of the drive controller assembly 108. The head 100 is moved by stepping a stepper motor (not illustrated) controlled by the drive controller assembly 108. The test fixture controller 304 measures the position of the head 100 relative to the mechanical reference position A at the point that the sensor 106 switches states (position B) and converts the distance of the head 100 from the mechanical reference position A (that is, distance B-A) into a corresponding number of stepper motor steps. This number of stepper motor steps is programmed into a memory device 314 via a cable 310 and spring loaded probes 312. Once this manufacturing calibration process is complete, the drive controller then accurately knows the number of stepper motor steps from the switching point B to the mechanical reference A. The switching point B is repeatable within a drive. Therefore, at power on or during a drive initialization process, the drive moves the head until the sensor switches states, and the position of the head is then accurately known in units of stepper motor steps.

In a specific embodiment, the mechanical reference point A is determined by a formatted tape. The tape formatting process includes two reference tracks at the beginning of tape and near the centerline of the tape, one reference track for each direction of tape travel. In the fixture illustrated in FIG. 3, a formatted tape is moved past the head 100 with the tape at the end containing the reference tracks. The head 100 is moved until the reference track corresponding to the direction of travel is detected. For the specific embodiment, that position is the mechanical reference A. The position of the head 100 at mechanical reference A is saved internally by the fixture controller 304. Then, as described above, the head is moved until sensor 106 switches states, thereby obtaining position B. The difference (B-A) is then recorded in the memory device 314. In normal operation after calibration, the process is just the opposite. That is, during initialization, the drive controller first moves the head 100 until the sensor 106 switches states. Then, the drive controller 108 reads the recorded distance B-A and moves the head 100 the appropriate distance to move to a recorded track.

Note that for FIG. 1 or FIG. 2, if the entire mechanical projection or entire head or entire lever arm can pass completely through the switching position, the position of the head when the sensor changes states is different for each of the two possible directions of head movement. For example, in FIG. 2, if the head is initially below the switch as illustrated and head movement is upward (towards position B), the switch will change states when the top of the head assembly reaches position B and then will switch back to the original state if the head is allowed to move upward beyond the switch. Then, if the direction of movement is downward, the bottom of the head assembly will trip the switch. Therefore, the switching position stored in the memory device (FIG. 3, 314) must be defined for only one direction of movement (for example, upward) or a separate switch position must be stored for each direction of movement.

In the specific example embodiment illustrated in FIG. 3, the linear position encoder (FIG. 3, 300) used in the calibration fixture is an Ono Sokki, Model GS-332 available from Don Richetts Company, 828 East Valley Blvd., San Gabriel, Calif. 91778. An example suitable optical sensor (FIG. 3, 106) is an OMRON part number EE-SX1042 available from OMRON Electronics, Inc., Control Components Division, One East Commerce Drive, Schaumburg, Ill. 60173. An example suitable memory device (FIG. 3, 314) for storing the switch trip position is an Erasable Programmable Read Only Memory (EPROM) but without a window for erasing, Microchip part number 27C256 available from Microchip Technology, Inc., 2107 North First Street, Suite 410, San Jose, Calif. 95131. The EPROM is also used to store controller firmware and other calibration values determined during the manufacturing process. In the specific sample embodiment, the entire mechanical probe 104 cannot pass completely through the sensor 106. Therefore, only one switch trip position is stored.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A position sensor system for an object, the position sensor system comprising:
   a controller for moving the object;
   a sensor, having first and second states, mounted so that as the object is moved by the controller to the sensor, the movement of the object causes the sensor to switch from the first state to the second state; and
   a memory device, readable by the controller, containing a numerical value, the numerical value indicative of a position of the object relative to a reference position when the sensor switches from the first state to the second state, the numerical value having been previously accurately determined, the position of the sensor relative to the reference position being unknown before determination of the numerical value, thereby enabling the position of the object relative to the reference position to be accurately known.

2. A position sensor system as in claim 1 where the object is a magnetic head.

3. A position sensor system as in claim 2 where the magnetic head is in a magnetic tape drive.

4. A position sensor system as in claim 1 where the sensor is an optical sensor.

5. A method for calibrating a position sensor for an object, the method comprising the following steps:
   a. moving the object with a controller;
   b. sensing when the sensor switches from a first state to a second state, the position of the sensor relative to a reference position being unknown;

c. measuring the position of the object relative to the reference position with a precision calibration fixture when the sensor switches from the first state to the second state; and d. recording the position of the object in a memory device readable by the controller, thereby enabling the position of the object relative to the reference position to be accurately known.

6. The method of claim 5 where the object is a magnetic head.

7. The method of claim 6 where the magnetic head is in a magnetic tape drive.

8. The method of claim 5 where the sensor is an optical sensor.

9. A method for precisely determining a position of an object relative to a reference position, the method comprising the following steps:

(a) moving the object with a controller, to a position sensor;

(b) sensing, by the controller, when the position sensor switches from a first state to a second state;

(c) reading, by the controller, a position value from a memory, the position value having been previously determined as the precise position of the object relative to a reference position when the position sensor switches from the first state to the second state, the position of the position sensor relative to the reference position being unknown before determination of the position value; and (d) determining, by the controller, from the position value, a precise position of the object relative to the reference position.

10. The method of claim 9 where the object is a magnetic head.

11. The method of claim 10 where the magnetic head is in a magnetic tape drive.

12. The method of claim 9 where the sensor is an optical sensor.

* * * * *